(12) United States Patent
Lutnesky et al.

(10) Patent No.: US 11,441,977 B2
(45) Date of Patent: Sep. 13, 2022

(54) BIOLOGICAL FLUID DILUTION DEVICES

(71) Applicant: Hewlett-Packard Development Company, L.P., Spring, TX (US)

(72) Inventors: Gary G. Lutnesky, Corvallis, OR (US); Si-lam Choy, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 601 days.

(21) Appl. No.: 16/492,267

(22) PCT Filed: Apr. 3, 2017

(86) PCT No.: PCT/US2017/025714
§ 371 (c)(1),
(2) Date: Sep. 9, 2019

(87) PCT Pub. No.: WO2018/186823
PCT Pub. Date: Oct. 11, 2018

(65) Prior Publication Data
US 2021/0080362 A1   Mar. 18, 2021

(51) Int. Cl.
*G01N 1/38* (2006.01)
*B01L 3/00* (2006.01)

(52) U.S. Cl.
CPC ............... *G01N 1/38* (2013.01); *B01L 3/502* (2013.01); *B01L 2200/0605* (2013.01); *B01L 2200/0684* (2013.01); *B01L 2400/0478* (2013.01)

(58) Field of Classification Search
CPC ...... G01N 1/38; G01N 2001/386; G01N 1/10; G01N 2001/1056; B01L 3/502;
(Continued)

(56) References Cited

U.S. PATENT DOCUMENTS 4,727,033 A    2/1988  Hijikata
6,098,471 A    8/2000  Berndtsson
(Continued)

FOREIGN PATENT DOCUMENTS

CH    544302    11/1973
EP    0508495   10/1992
(Continued)

OTHER PUBLICATIONS

International Search Report dated Dec. 14, 2 017 for PCT/US2017/025714, Applicant Hewlett-Packard Development Company, L.P.

*Primary Examiner* — Robert R Raevis
(74) *Attorney, Agent, or Firm* — Thorpe North & Western LLP

(57) ABSTRACT

A biological fluid dilution device can include a syringe body including a diluent chamber at a front end of the syringe body and a piston tube at a rear end of the syringe body. The diluent chamber can be partially filled with a diluent fluid. A moveable piston can be slidably engaged in the piston tube and form a fluid-tight seal with an interior surface of the piston tube. The moveable piston can include a metering groove to contain a precise volume of a biological fluid between the metering groove and the interior surface of the piston tube. A biological fluid inlet on the piston tube can be capable of delivering the biological fluid to the metering groove. The moveable piston can be slidable toward to diluent chamber to introduce the biological fluid in the metering groove into the diluent chamber.

15 Claims, 5 Drawing Sheets

(58) Field of Classification Search
CPC ....... B01L 2200/0605; B01L 220/0684; B01L 2400/0478
USPC .......... 73/863, 863.71, 863.72, 863.73, 864, 73/864.34, 864.83; 600/300, 573–584
See application file for complete search history.

(56) References Cited

U.S. PATENT DOCUMENTS

| | | |
|---|---|---|
| 7,347,617 B2 | 3/2008 | Pugia et al. |
| 7,459,128 B2 | 12/2008 | Karg et al. |
| 7,951,108 B2 | 5/2011 | Harper et al. |
| 2012/0101478 A1 | 4/2012 | Stroumpoulis |
| 2013/0291659 A1 | 11/2013 | Ling et al. |
| 2015/0182156 A1 | 7/2015 | Engbersen et al. |

FOREIGN PATENT DOCUMENTS

| | | |
|---|---|---|
| EP | 0802413 | 10/1997 |
| WO | 2005062015 | 7/2005 |

BIOLOGICAL FLUID DILUTION DEVICES

BACKGROUND

A variety of medical tests can be carried out by processing a biological fluid sample. For example, tests are often performed on blood, urine, sweat, saliva, spinal fluid, and other biological fluids. In some cases, these tests rely on diluted samples. The equipment and procedures for collecting samples, diluting samples, and performing tests are also many and varied. Equipment for collecting biological fluid samples is often designed to prevent contamination of the biological fluid sample, to reduce the risk of exposure to the biological fluid for a healthcare provider using the equipment, and to increase ease of use. In many cases this equipment is single-use, designed to be disposed after coming in contact with biological fluid in the interest of preventing the spreading of pathogens between patients through used equipment. Because biological sample collection equipment is often disposable, reducing cost can also be taken into account as a design factor.

BRIEF DESCRIPTION OF THE DRAWINGS

Additional features and advantages of the disclosure will be apparent from the detailed description which follows, taken in conjunction with the accompanying drawings, which together illustrate, by way of example, features of the present technology.

Figure 1:
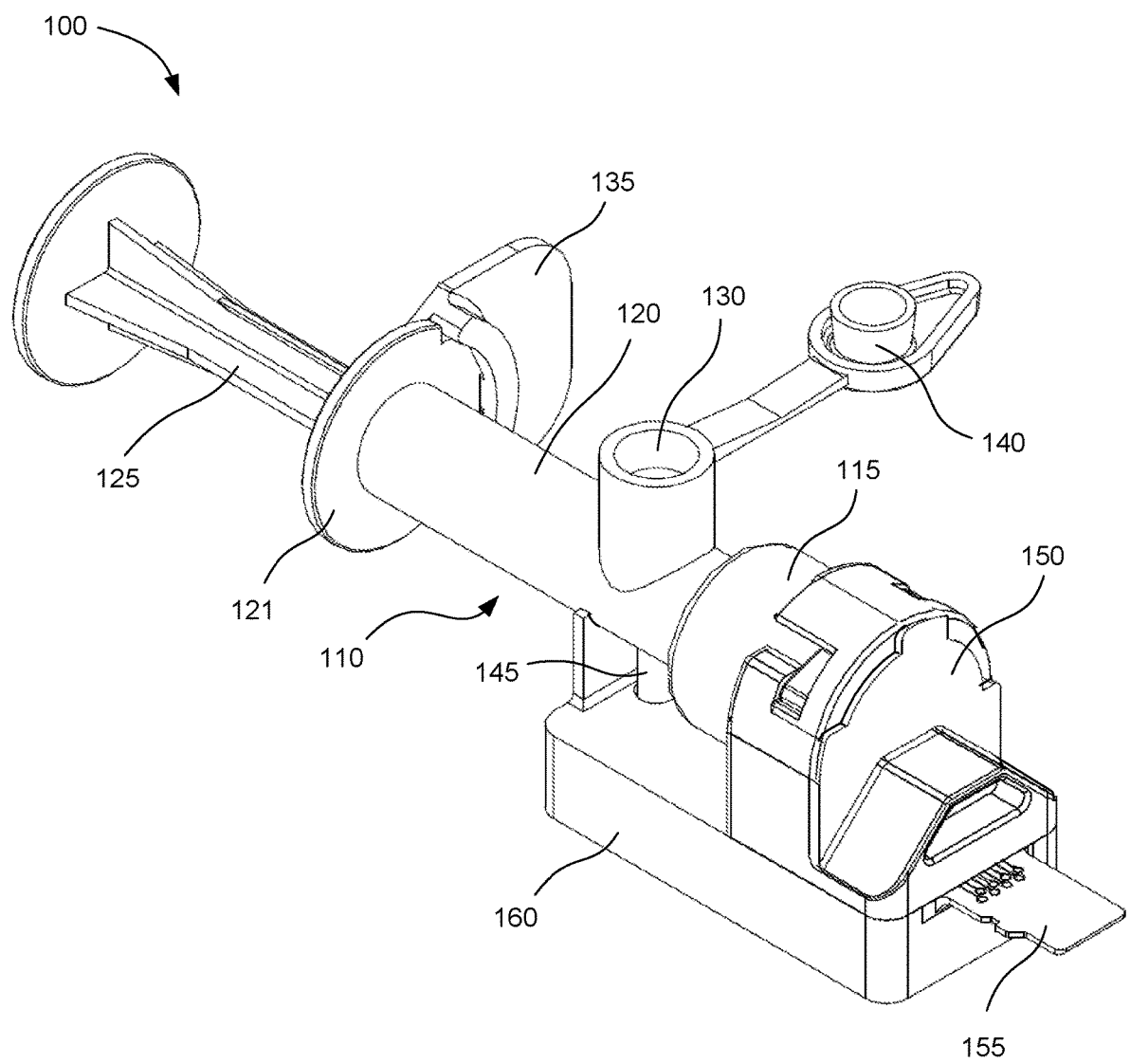
FIG. 1 is a perspective view of an example biological fluid dilution device in accordance with the present disclosure.

Reference will now be made to several examples that are illustrated herein, and specific language will be used herein to describe the same. It will nevertheless be understood that no limitation of the scope of the disclosure is thereby intended.

DETAILED DESCRIPTION

The present disclosure is drawn to biological fluid dilution devices. In one example, a biological fluid dilution device can include a syringe body that includes a diluent chamber partially filled with a diluent fluid at a front end of the syringe body and a piston tube at a rear end of the syringe body leading to the diluent chamber. A moveable piston can be slidably engaged in the piston tube to form a fluid-tight seal with an interior surface of the piston tube. The moveable piston can include a metering groove to contain a precise volume of a biological fluid between the metering groove and the interior surface of the piston tube. A biological fluid inlet on the piston tube can deliver the biological fluid to the metering groove. The moveable piston can be slidable toward the diluent chamber to introduce the biological fluid in the metering groove into the diluent chamber. In a further example, a piston plunger lock can be engaged with the piston to constrain the piston in a position where the metering groove is aligned with the biological fluid inlet. In another example, the biological fluid inlet can include a cap with an integrated pump for containing and pumping the biological fluid into the metering groove. In a particular example, the precise volume of biological fluid contained by the metering groove can be from about 1 µL to about 10 µL.

In some examples, the syringe body can include a vent port aligned with the biological fluid inlet to vent air from the metering groove. In one such example, an absorbent material can be in fluid communication with the vent port to absorb excess biological fluid from the vent port. In another example, the vent port can include a capillary break to retain excess biological fluid in the vent port. The capillary break can include a tapered portion and a narrowed opening with a smaller width than a width of the vent port.

In a further example, the metering groove can include a groove bottom surface formed of a first material and groove walls formed of a second material. The first material can have a higher surface energy than the second material. In another example, a pressure check valve can be located on the diluent chamber to release excess pressure in the diluent chamber.

In other examples, the device can include a MEMS chip including a pump to pump diluted biological fluid from the diluent chamber and a sensor to measure a property of the diluted biological fluid. In one such example, the device can also include an absorbent material into which the pump pumps the diluted biological fluid. In another example, the device can include an enclosure containing the absorbent material. The enclosure can include a vent port to the atmosphere in the form of a tortuous channel. In yet another example, the diluent chamber and MEMS chip can form a substantially airtight enclosure to reduce evaporation of the diluent fluid.

In further examples, a biological fluid dilution device can include a syringe body including a diluent chamber partially filled with a diluent fluid at a front end of the syringe body and a piston tube at a rear end of the syringe body leading into the diluent chamber. A moveable piston can be slidably engaged in the piston tube to form a fluid-tight seal with an interior surface of the piston tube. The moveable piston can include a metering groove to contain a precise volume of a biological fluid between the metering groove and the interior surface of the piston tube. A biological fluid inlet on the piston tube can be capable of delivering the biological fluid to the metering groove. The moveable piston can be slidable toward the diluent chamber to introduce the biological fluid in the metering groove into the diluent chamber. The device can also include a MEMS chip including a pump to pump diluted biological fluid from the diluent chamber and a sensor to measure a property of the diluted biological fluid. An absorbent material enclosure can be in fluid connection with the pump. The absorbent material enclosure can contain an absorbent material to absorb diluted biological fluid pumped from the diluent chamber. The syringe body can also include a vent port aligned with the biological fluid inlet to vent air from the metering groove. The vent port can vent the air into the absorbent material enclosure.

In still another example, a biological fluid dilution device can include a syringe base portion including a piston tube at a rear end of the syringe base portion. A syringe end cap can be pressure fitted to a front end of the syringe base portion to form a diluent chamber. The diluent chamber can be partially filled with a diluent fluid. A moveable piston can be slidably engaged in the piston tube to form a fluid-tight seal with an interior surface of the piston tube. The moveable piston can include a metering groove to contain a precise volume of a biological fluid between the metering groove and the interior surface of the piston tube. A biological fluid inlet on the piston tube can deliver the biological fluid to the metering groove. The moveable piston can be slidable toward the diluent chamber to introduce the biological fluid in the metering groove into the diluent chamber. The syringe base portion and syringe end cap can be formed from a polymer having a water vapor transmission rate of 0.5 g·mil/(24 hr·100 in$^2$) or less.

The biological fluid dilution devices described herein can solve several problems in the area of biological fluid testing. First, certain tests can benefit greatly from a precise dilution ratio of a biological fluid. In other words, the precision of the amounts of biological fluid and diluent that are mixed together can affect the accuracy of the test results. For example, blood count tests can measure the number of various types of blood cells in a blood sample. In some cases, the precise volume of blood tested can be known to provide meaningful test results. Other medical tests that involve a count or density measurement can also benefit from having a precise and known dilution ratio. For example, the biological fluid dilution devices described herein can be used for testing a variety of biological fluids including blood, urine, sweat, saliva, spinal fluid, and other biological fluids. The devices described herein can include a metering groove on the piston to easily measure a precise amount of a biological fluid sample. Thus, the volume of the biological fluid can be known for calculating test results. In certain examples, the diluent chamber can be pre-filled with a known volume of diluent. The known volume of biological fluid can be mixed with the known volume of diluent to give a known dilution of the fluid.

The biological fluid dilution devices described herein can also meet other design concerns of such equipment. The devices can include features to make the devices easy for healthcare providers to use, protect healthcare providers from exposure to biological fluids, and reduce manufacturing costs.

FIG. 1 shows an example biological fluid dilution device 100. The device includes a syringe body 110, which includes a diluent chamber 115 at a front end of the syringe body and a piston tube 120 at a rear end of the syringe body. A moveable piston attached to a plunger 125 is inserted into the piston tube so that the piston can slide forward and backward in the piston tube. The piston can form a fluid-tight seal with the interior surface of the piston tube. In this example, the piston includes a metering groove that can measure a precise volume of biological fluid between the metering groove and the interior surface of the piston tube. A biological fluid inlet 130 is on the piston tube. The biological fluid inlet can deliver a biological fluid sample to the metering groove on the piston. After the metering groove has been filled with biological fluid, the piston can be slid forward to introduce a precisely measured volume of biological fluid into the diluent chamber. The device also includes a piston plunger lock 135 engaged with the piston to constrain the piston in a position where the metering groove is aligned with the biological fluid inlet. The piston plunger lock in this example engages with a flange 121 on the piston tube to prevent the piston plunger lock from moving. The piston plunger lock can be removed before depressing the plunger to slide the piston into the diluent chamber. The device also can include a cap 140 that can be closed to cover the biological fluid inlet after a biological fluid has been loaded into the inlet. A vent port 145 on the syringe body can be aligned with the biological fluid inlet. The vent port can allow air to escape from the metering groove when the biological fluid flows into the metering groove. The front end of the syringe body can include a syringe end cap 150. The end cap can include an interface 155 with electrical traces that lead to a MEMS chip that is used to measure a property of the diluted biological fluid in the device. The MEMS chip can include a pump to pump diluted biological fluid from the diluent chamber and a sensor to measure a property of the fluid. An absorbent material enclosure 160 containing an absorbent material is in fluid communication with the outlet of the MEMS chip in this example. The absorbent material can capture the diluted fluid that is pumped through the MEMS chip. The absorbent material enclosure can also be connected to the vent port so that any biological fluid that flows through the vent port can be captured as well.

Figure 2:
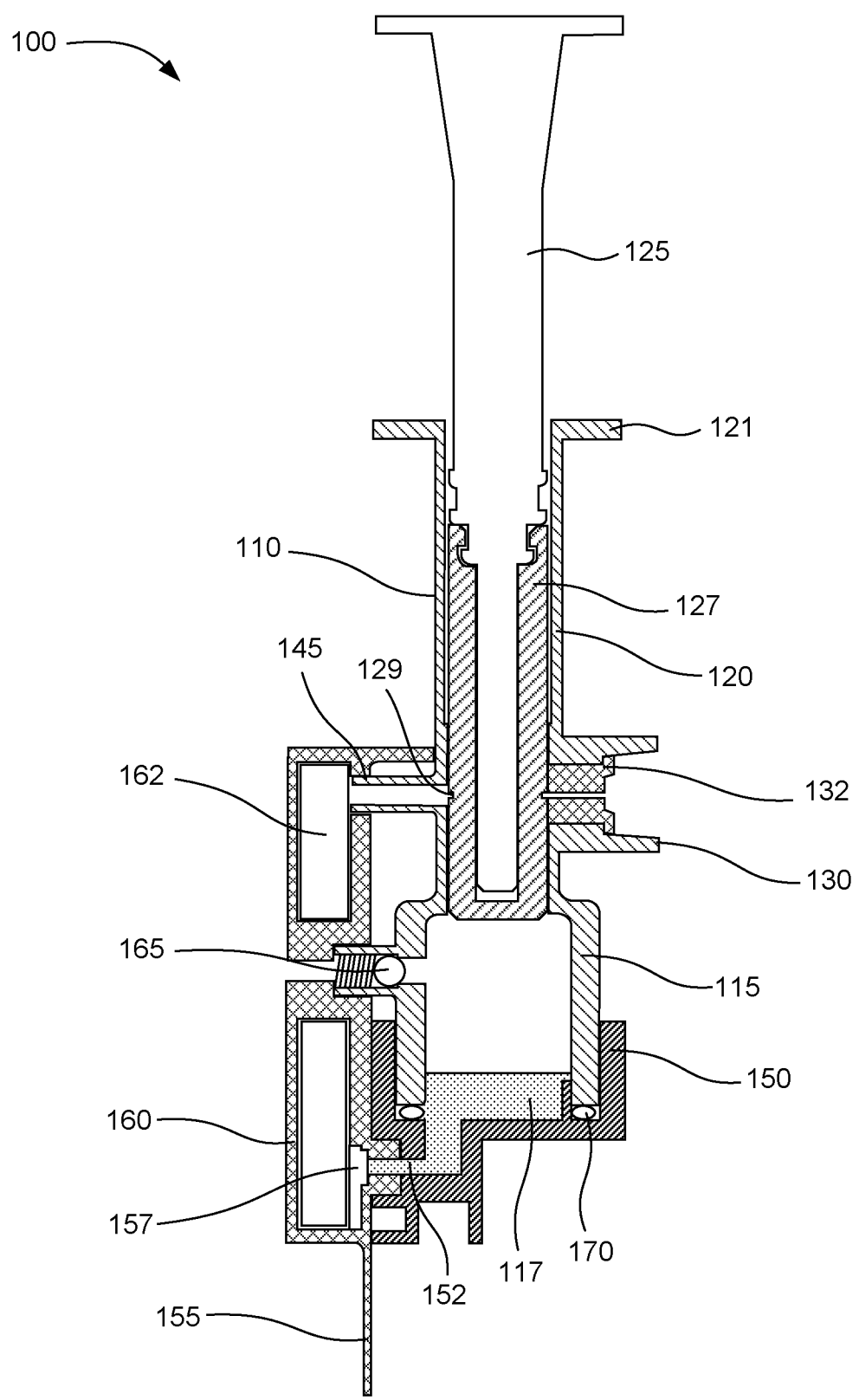
FIG. 2 is a side cross-sectional view of an example biological fluid dilution device in accordance with the present disclosure.

FIG. 2 shows a cross sectional view of an example biological fluid dilution device 100 to clarify the internal structure of the device described in FIG. 1. Thus, reference numerals in FIG. 2 correspond to reference numerals in FIG. 1 where the same structure is shown. The syringe body 110 can include the diluent chamber 115 and the piston tube 120, which in this example leads into the diluent chamber. The diluent chamber can be partially filled with a diluent fluid 117. The plunger 125 is shown as attached to the piston 127, which is inserted into the piston tube. The piston can include a metering groove 129, which can hold a precise or known volume of biological fluid when the piston slides in the piston tube toward the diluent chamber. In this particular example, the metering groove extends all the way around the circumference of the piston. Also in this example, the biological fluid inlet 130 includes a funnel 132 that can direct biological fluid into the metering groove. The vent port 145 is shown as aligned with the biological fluid inlet and the metering groove in this position. Air in the metering groove can vent through the vent port when biological fluid flows into the metering groove. The vent port can be connected to the absorbent material enclosure 160 which contains an absorbent material 162. Any excess biological fluid that flows from the metering groove into the vent port can be captured by the absorbent material. The syringe end cap 150 can include a pumping channel 152 leading to the MEMS chip 157. The MEMS chips can pump diluted biological fluid through the pumping channel and out into the absorbent material in the absorbent material enclosure. This example also shows a pressure check valve 165 on the diluent chamber to release excess pressure in the diluent chamber. Additionally, an O-ring 170 can be present between the diluent chamber and the syringe end cap to facilitate a fluid-tight seal.

Figure 3:
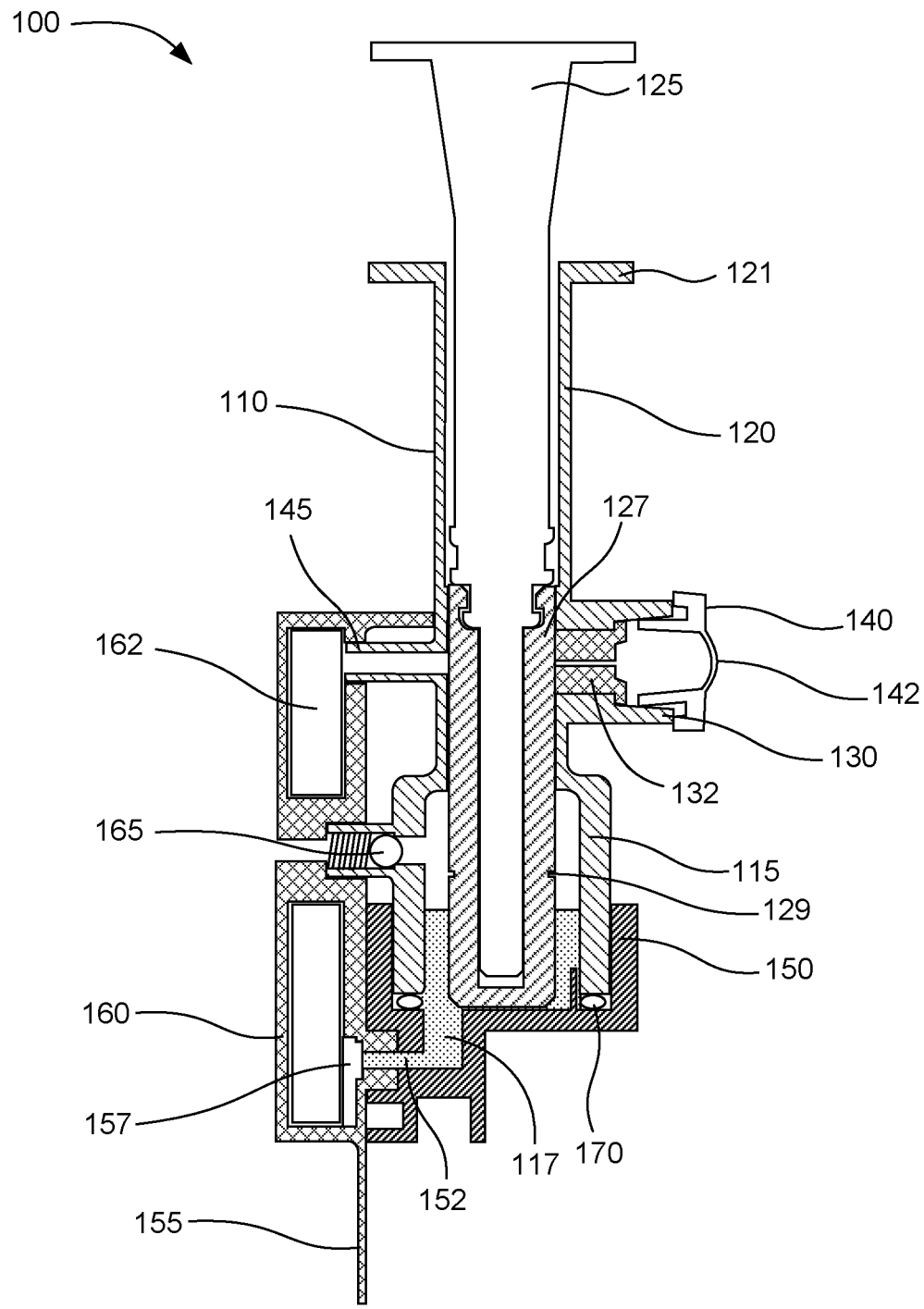
FIG. 3 is a side cross-sectional view of an example biological fluid dilution device in accordance with the present disclosure.

FIG. 3 shows another cross-sectional view of the biological fluid dilution device 100 in a position after a healthcare provider has depressed the plunger 125, and corresponds to FIGS. 1 and 2. Thus, reference numerals in FIGS. 1 and 2 correspond to reference numerals in this FIG. where the same structure is shown. In this example, the piston 127 can slide into the diluent chamber 115 and abut the syringe end cap 150. This exposes the metering groove 129 to the diluent fluid 117. The health care provider can shake the device to mix the biological fluid in the metering groove with the diluent fluid to form a diluted fluid. Also in this position, the cap 140 has been closed to cover the biological fluid inlet 130. In this example, the cap includes an integrated pump top 142 in the form of a flexible dome. The pump top can be pressed by the healthcare provider to force the biological fluid sample in the biological fluid inlet to flow down into the metering groove.

Figure 4:
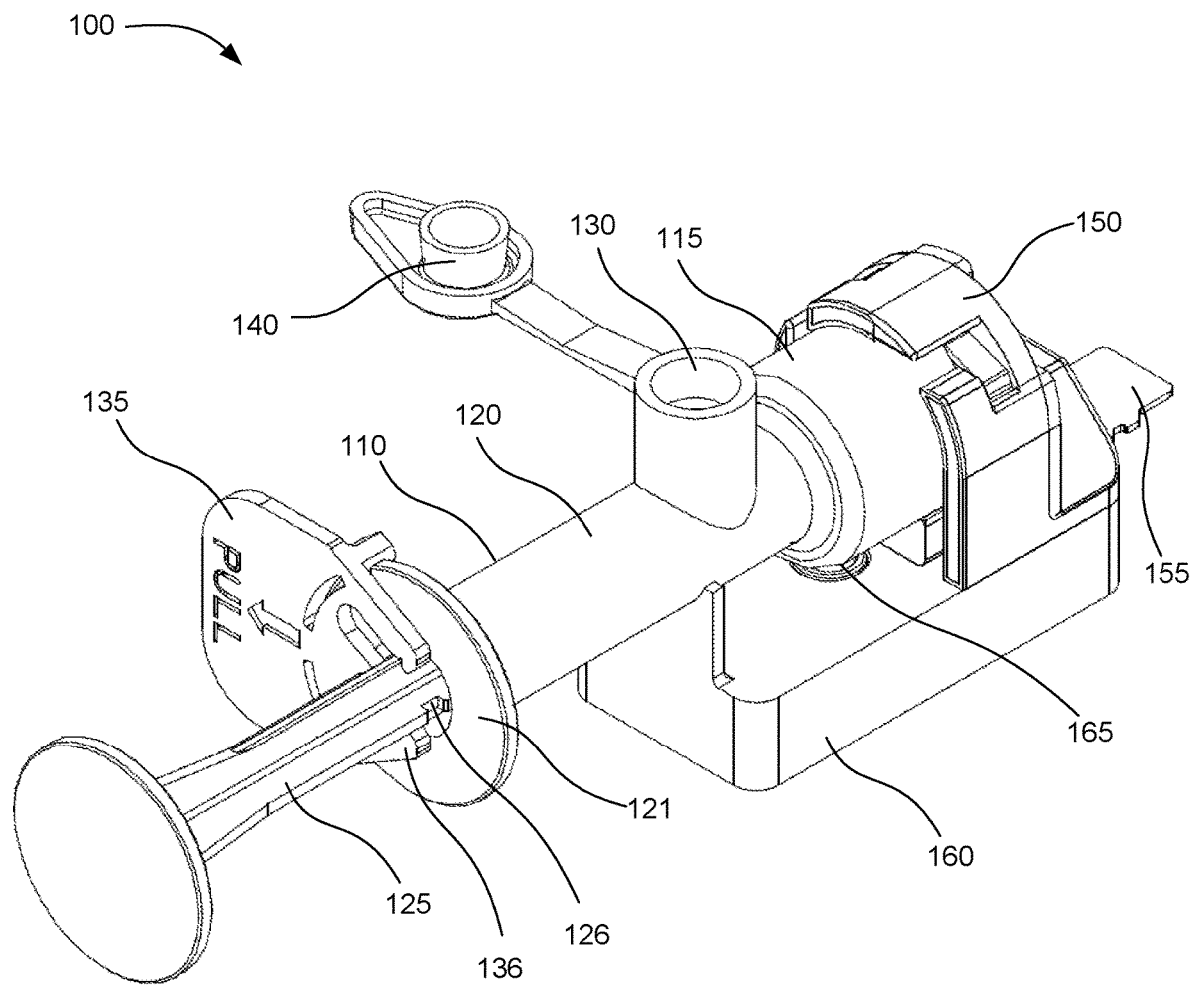
FIG. 4 is a perspective view of an example biological fluid dilution device in accordance with the present disclosure.

FIG. 4 shows another perspective view of the biological fluid dilution device 100 shown in FIGS. 1-3. Thus, reference numerals in FIGS. 1-3 correspond to reference numerals in this FIG. where the same structure is shown. The piston plunger lock 135 is shown attached to the plunger 125. In some examples, the device can be stored in this position before use. The piston plunger lock can maintain the piston in a position where the metering groove is aligned with the biological fluid inlet 130. After a biological fluid is introduced into the biological fluid inlet, the piston plunger lock can be removed so that the plunger can be depressed. In the example shown in FIG. 4, the plunger includes detents 126 at the appropriate location along the plunger to align with the piston plunger lock. The piston plunger lock includes clips 136 that engage with the detents. The piston plunger lock also engages with a flange 121 on the piston tube 120 to prevent the piston plunger lock from moving either toward or away from the piston tube. In some examples, the piston plunger lock can be removed by a healthcare provider by pulling on the piston plunger lock with moderate force.

In some examples, a healthcare provider can perform a test on a biological fluid by using the following procedure. The healthcare provider can place a biological fluid sample in the biological fluid inlet, close the cap, and press the dome to pump the biological fluid into the metering groove. The healthcare provider can then remove the piston plunger lock. The healthcare provider can tilt the device to a nearly vertical position, with the diluent chamber at the bottom, so that the pressure check valve is not submerged in the diluent fluid in the diluent chamber. The healthcare provider can then depress the plunger to move the piston into the diluent chamber. The pressure check valve can relieve excess pressure in the diluent chamber during this motion. Once the piston is depressed, typically completely depressed, the healthcare provider can shake the device to mix the biological fluid sample in the metering groove with the diluent fluid. At this point, the healthcare provider can connect the interface to the MEMS chip with a computer or similar device for controlling the MEMS chip to perform the desired test on the diluted biological fluid. When the test is complete, the device can be disconnected from the computer and discarded.

It should be noted that the figures included herein show specific examples of the present technology, and that the present technology is not necessarily limited by the figures. As such, the biological fluid dilution device described herein can have many other configurations in addition to those shown in the figures.

In various examples, the biological fluid dilution device can include a syringe body. The syringe body can include a piston tube and a diluent chamber. In some examples, the diluent chamber can be formed both from the syringe body and a syringe end cap that engages with the syringe body. In further examples, the syringe body can include the syringe end cap and a syringe base portion that includes a piston tube. The syringe end cap can engage with the syringe base portion to form the diluent chamber. In many examples, using a separate syringe end cap can facilitate pre-filling the diluent chamber with diluent fluid. For example, the portion of the syringe body forming the diluent chamber can be partially filled with diluent fluid and then the syringe end cap can be engaged with the syringe body to make a fluid-tight diluent chamber.

In certain examples, the syringe end cap can be engaged with the syringe body by pressure fitting. In one example, an O-ring can be located between the syringe body and the syringe end cap as shown in FIG. 2. In some examples, the syringe body can be formed of a material having a relatively low surface energy. Such materials can be lubricious, meaning that the syringe body has low friction. This property can make it easier to slide the piston through the piston tube of the syringe body. However, such materials can also be difficult to affix to other parts using adhesives, because adhesives tend to adhere poorly to these materials. Therefore, the syringe body and syringe end cap can be pressure fitted to avoid the use of adhesive.

In some examples, the piston tube and diluent chamber can be shaped as cylinders as shown in FIGS. 1-4. However, the shaped of these features is not particularly limited and other shapes can be used as well. In some cases, using a piston design with sharp corners, such as a square-shaped piston, can lead to poor sealing at the corners. Accordingly, in some examples the shape of the piston can be without sharp corners. In a particular example, the piston can be shaped as a cylinder.

The syringe body can be manufactured using various processes, such as molding, machining, 3D printing, and so on. In certain examples, the syringe body can be formed by molding a polymeric material. In certain examples, the polymer used to form the syringe body can have good lubricity, low water vapor transmission rate, or both. Water vapor transmission rate, also referred to as moisture vapor transmission rate, refers to the rate of water vapor penetrating through a material over time. Water vapor transmission rate can be expressed in units of mass of water divided by distance divided by time. In some cases, the units are expressed as $g \cdot mil/(24\ hr \cdot 100\ in^2)$. This would represent grams of water passing through a sheet of material one mil thick ($\frac{1}{1000}^{th}$ inch) with an area of 100 $in^2$ over 24 hours. In some examples, the material of the syringe body can have a water vapor transmission rate of 0.5 $g \cdot mil/(24\ hr \cdot 100\ in^2)$ or less, for example from about 0.01 $g \cdot mil/(24\ hr \cdot 100\ in^2)$ to 0.5 $g \cdot mil/(24\ hr \cdot 100\ in^2)$.

Non-limiting examples of polymers that can be used to form the syringe body can include high density polyethylene, polypropylene, and combinations thereof. In one example, polypropylene can provide good lubricity and a low water vapor transmission rate.

In some examples, the syringe body can be formed as two pieces that can be joined together. In one example, a syringe base portion can be molded as one piece, including the piston tube and a portion of the diluent chamber. A syringe end cap can be molded as a second piece. The syringe end cap can be attached to the syringe base portion to form the syringe body, with the syringe end cap completing the diluent chamber. In a particular example, the diluent chamber can be partially filled with a diluent fluid before the syringe end cap is attached. The syringe end cap can be attached to the syringe base portion by any suitable method, such as pressure fitting, bonding with adhesive, welding, and so on. In one example, the syringe end cap can be pressure fitted to the syringe base portion with an O-ring between the two parts to form a fluid-tight seal.

As mentioned above, in various examples the diluent chamber can be partially filled with a diluent fluid. In some examples, the diluent chamber can be pre-filled with a known amount of diluent fluid at the time of manufacture of the device. The device can be packaged with the diluent fluid inside to be ready for use by a healthcare provider. In some examples, the amount of diluent fluid in the diluent chamber can be sufficient to provide a dilution ratio of 10:1 to 100:1 when mixed with biological fluid in the metering groove. In further examples, the amount of diluent fluid can be sufficient to leave an amount of air in the diluent chamber when the piston is depressed into the diluent chamber. For example, a volume ratio of air to diluent fluid in the diluent chamber after the piston is completely depressed can be from about 1:1 to about 10:1. In certain examples, the amount of diluent fluid pre-filled in the diluent chamber can be from about 100 µL to about 1000 µL. In further examples, the volume of air initially in the diluent chamber can be from about 1000 µL to 5000 µL. The volume of air remaining after the piston is depressed can be from about 500 µL to about 3000 µL.

In some cases a pump of a MEMS chip can pump diluted fluid out of the diluent chamber. However, the pump can sometimes have difficulty pumping against a negative pressure in the diluent chamber. The more air present in the diluent chamber, the less the pressure in the diluent chamber will change as diluted fluid is pumped out. However, in the event that a large volume of diluted fluid can be pumped out of the diluent chamber, the diluent chamber can, in certain examples, include a bubble generator to admit additional air into the diluent chamber. In some examples a bubble generator can be a small opening in the diluent chamber that is too small for the diluent fluid to leak out of, but which can admit bubbles of air when the pressure inside the diluent chamber becomes too low. The additional air can restore some pressure in the diluent chamber before the pressure becomes too low for the MEMS pump to function. In certain examples, the bubble generator can include an opening that has a width from about 10 µm to about 150 µm.

As shown in FIGS. 2-3, in some examples the device can include a pressure check valve 165. The pressure check valve can release excess positive pressure caused by sliding the piston into the diluent chamber. In some examples, a healthcare provider can hold the device at angle so that the diluent fluid does not contact the pressure check valve before depressing the plunger. For example, the healthcare provider can hold the device vertically or close to vertical, with the diluent chamber at the bottom. Gravity can then cause the diluent fluid to settle at the front end of the diluent chamber, away from the pressure check valve as shown in FIGS. 2-3. In certain examples, the pressure check valve can be designed to open and release pressure when the diluent chamber reaches a positive pressure from about 0.1 psig to 10.0 psig. In further examples, the pressure check valve can include a ball and spring as shown in FIGS. 2-3, or the pressure can valve can be another types of check valve, such as a diaphragm check valve, a swing check valve, or others.

The piston used in the device can be sized and shaped to form a fluid tight seal inside the piston tube of the syringe body. In certain examples, the piston can be formed from a material that has a good lubricity so that the piston can slide easily inside the piston tube. In further examples, the piston can be formed from a flexible material such as a rubber. In a particular example, the piston can be formed from ethylene propylene diene monomer (EPDM) rubber. The piston can be made by any suitable method of manufacturing. In some examples, the piston can be molded. In a certain examples, the piston can be molded in such a way that no seams are present on the surface of the piston that forms the fluid tight seal with the piston tube. In another example, the piston can be molded over the plunger. In yet another example, the piston can be molded to snap fit over the plunger. The plunger can be molded from a more rigid material.

The piston can include a metering groove in the surface of the piston that forms a seal with the piston tube. As mentioned above, a biological fluid can be placed in the biological fluid inlet and then flow into the metering groove. When plunger is depressed and the piston slides through the piston tube toward the diluent chamber, the metering groove can retain the biological fluid. The amount of biological fluid contained in the metering groove can be a precise volume, corresponding to the volume bounded by the metering groove and the interior surface of the piston tube. Any excess biological fluid can be sheared away when the piston begins to slide through the piston tube. The excess fluid can remain in the biological fluid inlet or the vent port on the piston tube.

The shape of the metering groove is not particularly limited. The metering groove shown in FIGS. 2-3 is a circumferential groove extending around the circumference of the piston. In this example, the biological fluid can be introduced into the biological fluid inlet and then flow into the metering groove. The biological fluid can displace air in the metering groove, and the air can escape through the vent port. In some cases, a small amount of biological fluid can flow out of the metering groove into the vent port. In this way, the entire volume of the metering groove can be filled with the biological fluid. In further examples, the metering groove can have another shape besides a circumferential shape. In certain examples, the metering groove can connect the biological fluid inlet to the vent port.

In some cases, the metering groove can be to wick the biological fluid into the metering groove without any applied pressure. However, in some cases the biological fluid can be viscous and so pressure can be applied to force the biological fluid into the metering groove. In some examples, this pressure can be provided by a pump integrated into the cap that covers the biological fluid inlet. The pump can be a simple feature such as a flexible portion of the cap that can be depressed by a finger of the healthcare provider to pressurize the interior volume of the biological fluid inlet. In FIGS. 1, 3, and 4, the cap is shown having a dome that can be pressed to pump biological fluid into the metering groove.

In some examples, the piston can be formed from a flexible and lubricious material to improve sealing of the piston with the piston tube and the ability of the piston to slide along the piston tube. For example, the piston can be formed from a rubber material. However, such materials can in some cases have a low surface energy which does not contribute to wicking of biological fluid into the metering groove. In certain examples, a higher surface energy material can be included in the metering groove to improve wicking of biological fluid in the metering groove. In one example, the metering groove can have a groove bottom formed of a first material and groove walls formed of a second material, where the first material has a higher surface energy than the second material. In a particular example, the piston can be formed with a piston core made of the first material, and then a coating of the second material can be applied over the piston core. The groove bottom surface can be a portion of the core that is not coated with the second material.

As mentioned above, in some examples a vent port can be aligned with the biological fluid inlet to allow air in the metering groove to escape as biological fluid flows into the metering groove. In some cases, a portion of the biological fluid can flow through the metering groove and into the vent port. The biological fluid that flows into the vent port can be retained by the device to avoid exposure of the healthcare provider or others to the biological fluid. In some examples, the vent port can lead to an absorbent material that can capture the biological fluid. Non-limiting examples of absorbent materials can include natural fibers, synthetic fibers, silica gel, absorbent polymers, and others. In one example, the absorbent material can include bonded polyester fiber.

In further examples, the absorbent material can be contained in an absorbent material enclosure. The vent port of the piston tube can lead to this absorbent material enclosure. In some examples, the absorbent material enclosure can include its own vent port to the atmosphere. This can provide a way for air to escape from the enclosure when the air in the metering groove is displaced by biological fluid. Without a connection to the atmosphere, backpressure can develop in the absorbent material enclosure which can potentially push the biological fluid back out of the metering groove. In certain examples, the vent port of the absorbent material enclosure can be in the form of a tortuous channel having many turns to slow diffusion through the vent port. This can reduce the evaporation rate of fluid from the device while also preventing backpressure from developing in the absorbent material enclosure. In some examples, the tortuous channel can have a small width and long length, such as from 0.1 mm to 5 mm in width and from 10 mm to 500 mm in length.

In still other examples, the vent port of the piston tube can include a capillary break to retain biological fluid in the vent port. As used herein, "capillary break" refers to a feature of the vent port that includes a tapered portion of the vent port and a narrowed opening with a smaller width than the width of the vent port. The capillary break can use capillary forces to prevent biological fluid from passing the capillary break and flowing out of the vent port. Generally, a smaller diameter capillary tube can exhibit a stronger capillary force drawing fluid into the capillary tube. The strength of the capillary force can increase with decreasing diameter of the tube. Thus, the capillary break in the vent port can taper to a narrow opening that has higher capillary force than the wider vent port diameter. After the capillary break, the diameter can abruptly increase back to the original diameter of the vent port. Capillary forces can tend to retain biological fluid in the narrow opening rather than allowing the biological fluid to flow further through the vent port.

Figure 5:
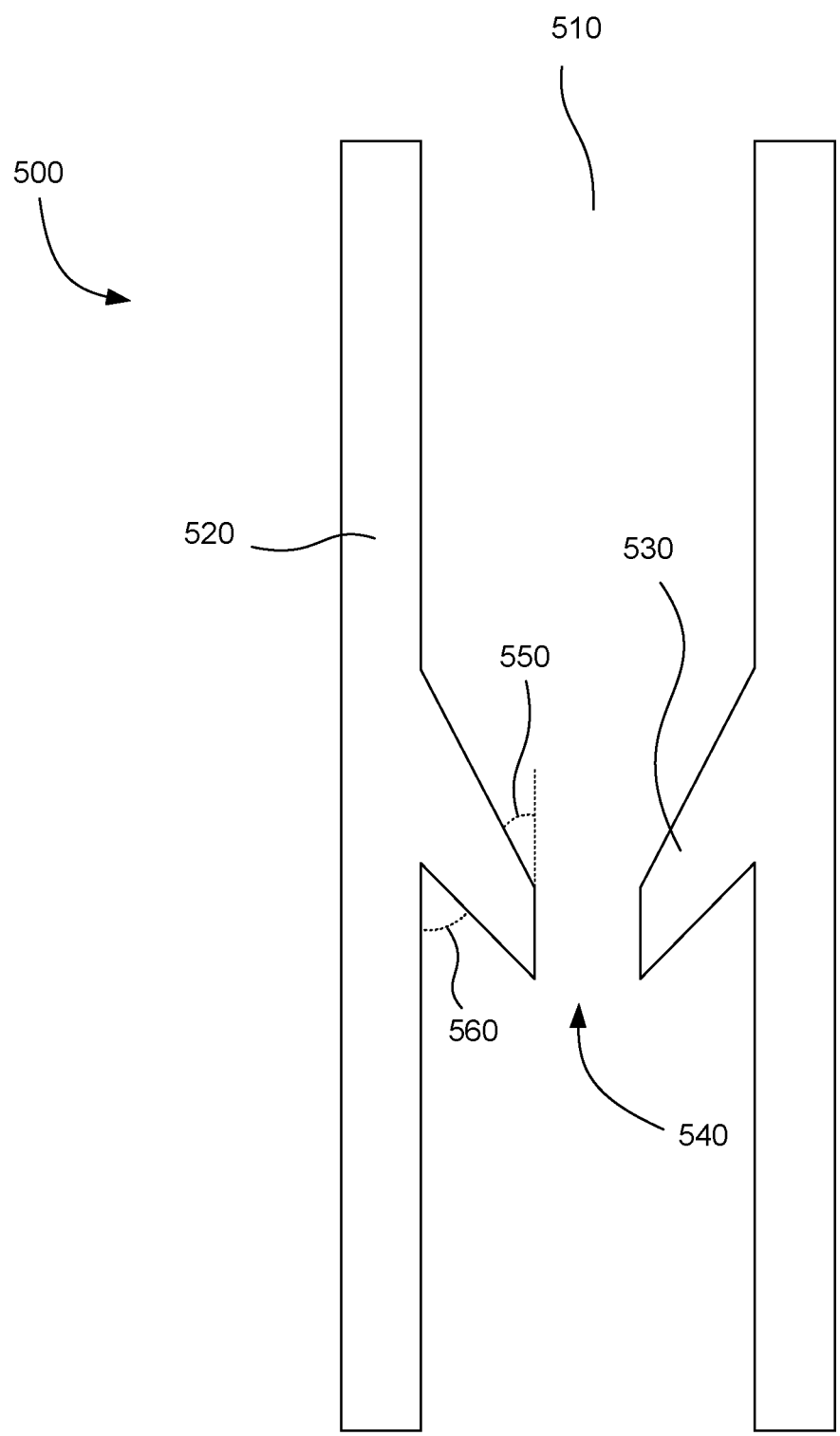
FIG. 5 is a side cross-sectional view of an example capillary break in accordance with the present disclosure.

FIG. 5 shows a cross-sectional view of an example of a capillary break 500 as described above. A vent port interior volume 510 is shown inside vent port walls 520. A tapered portion 530 can lead to a narrowed opening 540. When biological fluid flows down the vent port, the fluid can be stopped and form a meniscus in the narrowed opening due to the increased capillary force in the narrowed opening. In some examples, the effectiveness of the capillary break can be affected by the interior tapering angle 550 and exterior tapering angle 560. In certain examples, the interior tapering angle can be from about 10° to about 60°, and the exterior tapering angle can be from about 15° to about 120°.

As mentioned above, in some examples the piston can be held in place with a piston plunger lock. The lock can be designed to hold the piston in a position where the metering groove is aligned with the biological fluid inlet. The lock can also prevent accidental depression of the plunger before the healthcare provider has introduced the biological fluid sample into the metering groove. After the biological fluid sample is loaded in the metering groove, the healthcare provider can unlock the piston plunger lock and then depress the plunger. In some examples, the piston plunger lock can be a removable part attached onto the plunger. The healthcare worker can remove the lock to free the plunger. In one such example, the piston plunger lock can be a tab that clips into the plunger. The plunger can include detents located in a specific location that causes the metering groove on the piston to be aligned with the biological fluid inlet when the lock is engaged. The lock can also engage with a flange at a rear end of the piston tube to hold the plunger in place with respect to the piston tube. In other examples, the piston plunger lock can be a mechanical lock that is a part of the device. The piston plunger lock can be unlocked by rotating, sliding, or otherwise actuating a locking mechanism, for example.

After unlocking the piston lock, the healthcare provider can depress the plunger to introduce the biological fluid in the metering groove into the diluent chamber. The biological fluid can then mix with the diluent fluid to form a diluted biological fluid. Turning now to sensing mechanisms for measuring properties of the diluted biological fluid, in some examples the device can include a MEMS chip capable of measuring a property of the diluted biological fluid. In certain examples, the MEMS chip can include a pump to pump diluted biological fluid from the diluent chamber. In some specific examples, the pump can include a microfluidic channel and a thermal resistor or piezoelectric element to displace fluid in the microfluidic channel. The microfluidic channel can have a width of about 20 µm to about 100 µm in some examples. Such pumps can operate in a somewhat similar way to thermal or piezoelectric inkjet print heads. A resistor can form a temporary bubble in the fluid in the microfluidic channel, which displaces surrounding fluid and pumps the fluid along the microchannel. When the bubble collapses, more fluid can flow in to fill the volume that was occupied by the bubble. This process can be repeated many times per second to pump fluid through the microfluidic channel. Depending on the geometry of the microchannel and the presence of valves or other features to rectify the flow of fluid through the microfluidic channel, this action can result in a net flow of fluid in one direction. Pumps that incorporate piezoelectric elements can operate in a similar way, using the piezoelectric element to displace fluid many times per second.

In further examples, the MEMS chip can include a sensor to measure a property of the diluted biological fluid. In some cases, the sensor can be located upstream of the pump. In certain examples, The MEMS chip can include a microfluidic channel with a sensor located on the microfluidic channel and a pump in another location on the microfluidic channel, which the sensor upstream of the pump. A variety of sensors can be used to sense various properties of the diluted biological fluid. In some examples, the sensor can include an impedance sensor. In particular, the sensor can include electrodes oriented on sides of the microfluidic channel so that the impedance across the gap between the electrodes can be measured. In one particular example, the biological fluid can be blood and the sensor can be a cell counter to count individual blood cells passing by the impedance sensor. Each change in impedance can represent a single blood cell.

In some examples, it may be expected that the output of the sensor can reach a steady state output after a certain period of time. For example, in the case of a blood cell counting sensor, the measured blood cell concentration can start very low because diluent fluid in the narrow channels leading to the sensor can be difficult to mix with the blood sample from the metering groove. After a period of time, the pump can cycle through the poorly mixed fluid in the channels and then the well mixed fluid from the diluent chamber can be measured by the sensor. Thus, the sensor output can show a low concentration at first, and then lead up to a plateau or steady state concentration that represents the true blood cell concentration of the well mixed diluted blood.

In addition to the pump and sensor, the MEMS chip can include electrical traces or any other suitable electrical connection that can be connected to an interface with a processor for controlling the pump and reading the sensor. In some examples, the MEMS chip in the device may not have an onboard processor or power source to run the pump and sensor. The MEMS chip can have an interface that can be plugged into a personal computer or a specialized sensor reading device. The computer of sensor reading device can provide power to the pump and sensor, as well as recording and interpreting signals from the sensor. By using a separate computer of sensor reading device, the cost of the biological fluid dilution device itself can be minimized by not including expensive electronic components on the disposable biological fluid dilution device. However, in other examples the biological fluid dilution device can be self-contained and include a power source and processor necessary to operate the pump and sensor.

In certain examples, the MEMS chip can pump diluted biological fluid from the diluent chamber into an absorbent material enclosure. In some cases, a single absorbent material enclosure can be used to capture the diluted biological fluid from the MEMS chip as well as the excess biological fluid that flows from the metering groove through the vent port. Thus, the vent port of the piston tube and the outlet of the MEMS chip can both lead to the absorbent material enclosure.

The MEMS chip and diluent chamber together can for a substantially airtight enclosure that reduces evaporation of the diluent fluid from the diluent chamber. The microfluidic channels in the MEMS chip can have a very small channel width, which can result in a very small amount of evaporation. In some examples, the absorbent material enclosure can have a vent port with a tortuous channel as described above in order to further slow evaporation of the diluent fluid.

In other examples, the MEMS chip can circulate diluted biological fluid back into the diluent chamber instead of pumping the diluted biological fluid out into an absorbent material enclosure. In these examples, the device can include no outlet for waste diluted biological fluid because the dilute biological fluid is merely circulated back into the diluent chamber.

It is noted that, as used in this specification and the appended claims, the singular forms "a," "an," and "the" include plural referents unless the context clearly dictates otherwise.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLE

Cell Counting of a Diluted Blood Sample

A biological fluid dilution device as shown in FIGS. 1-4 is used to perform a blood cell count test on a blood sample. First, a healthcare provider collects a blood sample from a patient. The healthcare worker then places the blood sample into the biological fluid inlet, closes the cap, and depresses the dome-shaped pump top on the cap to pump the blood sample down into the metering groove on the piston. The healthcare worker pulls on the piston plunger lock tab with sufficient force to unclip the tab from the plunger. The healthcare worker then tilts the device to a near vertical position so that the diluent fluid in the diluent chamber is clear of the pressure check valve. The healthcare provider depresses the plunger as far as it will go. The piston bottoms out against the syringe end cap, at which point the metering groove is located within the diluent chamber. The healthcare provider now shakes the device to mix the blood sample in the metering groove with diluent fluid. The healthcare provider plugs the interface of the MEMS chip into a sensor reading device. The sensor reading device powers the MEMS chip and causes the pump to begin pumping diluted blood through a microchannel. An impedance sensor is located on the microchannel upstream of the pump. The sensor reading device registers each spike in impedance as a single blood cell travelling past the sensor. The waste diluted blood is pumped out into absorbent material in the absorbent material enclosure. The sensor reading device measures a blood cell concentration that begins low and ramps up to a steady state concentration. The steady state concentration corresponds to the concentration of blood cells in the well mixed diluted blood. The sensor reading device reaches the steady state concentration after about 5 µL of diluted blood has been pumped from the diluent chamber. When the sensor reading device has measured a reliable blood cell concentration, the healthcare provider disconnects the interface and discards the biological fluid dilution device.

The above illustrates an example of the present disclosure. However, it is to be understood that this example is only illustrative of the application of the principles of the present disclosure. Numerous modifications and alternative compositions, methods, devices, and systems may be devised without departing from the spirit and scope of the present disclosure. The appended claims are intended to cover such modifications and arrangements.

What is claimed is:

1. A biological fluid dilution device, comprising:

a syringe body comprising a diluent chamber partially filled with a diluent fluid at a front end of the syringe body and a piston tube at a rear end of the syringe body leading into the diluent chamber;

a moveable piston slidably engaged in the piston tube and forming a fluid-tight seal with an interior surface of the piston tube, wherein the moveable piston comprises a metering groove to contain a precise volume of a biological fluid between the metering groove and the interior surface of the piston tube; and a biological fluid inlet on the piston tube capable of delivering the biological fluid to the metering groove, wherein the moveable piston is slidable toward the diluent chamber to introduce the biological fluid in the metering groove into the diluent chamber.

2. The device of claim 1, further comprising a piston plunger lock engaged with the piston to constrain the piston in a position where the metering groove is aligned with the biological fluid inlet.

3. The device of claim 1, wherein the biological fluid inlet comprises a cap with an integrated pump for containing and pumping the biological fluid into the metering groove.

4. The device of claim 1, wherein the syringe body further comprises a vent port aligned with the biological fluid inlet to vent air from the metering groove.

5. The device of claim 4, further comprising an absorbent material in fluid communication with the vent port to absorb excess biological fluid from the vent port.

6. The device of claim 4, wherein the vent port comprises a capillary break to retain excess biological fluid in the vent port, the capillary break including a tapered portion and a narrowed opening with a smaller width than a width of the vent port.

7. The device of claim 1, wherein the metering groove includes a groove bottom surface formed of a first material and groove walls formed of a second material, wherein the first material has a higher surface energy than the second material.

8. The device of claim 1, further comprising a pressure check valve on the diluent chamber to release excess pressure in the diluent chamber.

9. The device of claim 1, further comprising a MEMS chip comprising a pump to pump diluted biological fluid from the diluent chamber and a sensor to measure a property of the diluted biological fluid.

10. The device of claim 9, further comprising an absorbent material into which the pump pumps the diluted biological fluid.

11. The device of claim 10, further comprising an enclosure containing the absorbent material, the enclosure including a vent port to the atmosphere in the form of a tortuous channel.

12. A biological fluid dilution device, comprising:

a syringe body comprising a diluent chamber partially filled with a diluent fluid at a front end of the syringe body and a piston tube at a rear end of the syringe body leading into the diluent chamber;

a moveable piston slidably engaged in the piston tube and forming a fluid-tight seal with an interior surface of the piston tube, wherein the moveable piston comprises a metering groove to contain a precise volume of a biological fluid between the metering groove and the interior surface of the piston tube;

a biological fluid inlet on the piston tube capable of delivering the biological fluid to the metering groove, wherein the moveable piston is slidable toward the diluent chamber to introduce the biological fluid in the metering groove into the diluent chamber;

a MEMS chip comprising a pump to pump diluted biological fluid from the diluent chamber and a sensor to measure a property of the diluted biological fluid; and an absorbent material enclosure in fluid communication with the pump, the absorbent material enclosure containing an absorbent material to absorb diluted biological fluid pumped from the diluent chamber;

wherein the syringe body further comprises a vent port aligned with the biological fluid inlet to vent air from the metering groove, wherein the vent port vents air into the absorbent material enclosure.

13. The device of claim 12, wherein the precise volume of biological fluid contained by the metering groove is from about 1 μL to about 10 μL.

14. A biological fluid dilution device, comprising:

a syringe base portion comprising a piston tube at a rear end of the syringe base portion;

a syringe end cap pressure fitted to a front end of the syringe base portion to form a diluent chamber, wherein the diluent chamber is partially filled with a diluent fluid;

a moveable piston slidably engaged in the piston tube and forming a fluid-tight seal with an interior surface of the piston tube, wherein the moveable piston comprises a metering groove to contain a precise volume of a biological fluid between the metering groove and the interior surface of the piston tube; and a biological fluid inlet on the piston tube capable of delivering the biological fluid to the metering groove, wherein the moveable piston is slidable toward the diluent chamber to introduce the biological fluid in the metering groove into the diluent chamber, and wherein the syringe base portion and syringe end cap are formed of a polymer having a water vapor transmission rate of $0.5\ g\cdot mil/(24\ hr\cdot 100\ in^2)$ or less.

15. The device of claim 14, further comprising a vent port aligned with the biological fluid inlet to vent air from the metering groove, wherein the vent port comprises a capillary break to retain excess biological fluid in the vent port, the capillary break including a tapered portion and a narrowed opening with a smaller width than a width of the vent port.

* * * * *